Nov. 7, 1967 R. G. BROWN ETAL 3,350,998
TILTED BUNDLE TYING MACHINE AND CONVEYOR FEED THEREFOR
Filed Nov. 15, 1965 11 Sheets-Sheet 4

INVENTORS
ROBERT G. BROWN
HAROLD J. ROSENBERG
BY Horton, Davis, Brewer & Brugman
Attys.

United States Patent Office 3,350,998
Patented Nov. 7, 1967

3,350,998
TILTED BUNDLE TYING MACHINE AND
CONVEYOR FEED THEREFOR
Robert G. Brown and Harold J. Rosenberg, Washington,
D.C., assignors to B. H. Bunn Company, Chicago, Ill.,
a corporation of Illinois
Filed Nov. 15, 1965, Ser. No. 507,915
29 Claims. (Cl. 100—4)

ABSTRACT OF THE DISCLOSURE

Apparatus for tying flat articles together including long-tie and cross-tie tying machines of standard design and an endless intermittently operated conveyor for pushing the articles through said machines from a loading station to an unloading station, the cross-tie tying machine being modified to accept the articles at an angle to the plane of the table normally provided with the machine so that a straight-through movement of the articles past the frame of the tying machine is possible without resorting to ring-type tying machines. Hold-down mechanisms are provided at each tying machine, with automatic means for controlling the mechanisms in timed relation to the movement of the conveyor, and for stopping the conveyor in an emergency.

*Background of the invention*

This invention relates to tying machines and particularly to a conveyorized system for continuously tying a long tie and one or more cross-ties on relatively wide bundles of flat articles such as a magazines, envelopes and the like.

For optimum efficiency it is desirable to tie all ties around a bundle in the time it takes to tie a single tie, i.e., the speed of the tying machine in making one tie determines the maximum capacity of a conveyorized system. Where both long ties and cross-ties are to be used, it is more efficient to have individual tying machines for each tie than to turn a bundle in the same machine to tie both the long and cross-ties. Furthermore, where two or more ties are necessary, thus making necessary two or more machines, it is desirable that the bundles move from one machine to another in a straight line, since it is more difficult to retain full control over a bundle when it must be released from one conveyor and picked up by another. A straight-through operation, however, is not feasible with the usual tying machine since for at least one of the ties the bundle must move toward the portion of the tying machine frame on which the twine arm is mounted, and the frame thus obstructs movement of the bundles in that direction.

One solution that has ben proposed is to use a special tying machine wherein the twine arm is mounted on a ring instead of on a shaft supported on an A-frame. Such machines are known as "ring-tie" machines and make possible a straight-through operation of a conveyorized system, because the bundle can pass directly through the ring. Ring-tie machines are special, however, and it is better for maintenance reasons to have all of the tying machines in a system alike.

It is an object of this invention to provide a conveyorized, straight-through type of system for tying a long and one or more cross-ties on flat bundles wherein all ties are made by the same type of tying machine.

More specifically, it is an object of this invention to provide a conveyorized straight-through type of system for tying long and cross-ties on bundles wherein only shaft-driven twine arm types of tying machines are used.

It may be appreciated that in the well-known twine arm type of tying machine, the knotter mechanism and all parts of the bundle must lie within the sweep of the rotatable twine arm for a reach of twine to be wrapped around the bundle by the twine arm. Under normal circumstances, the knotter mechanism is disposed below the table of the machine on which the bundle is tied, and to one side of the axis of the twine arm, so that the knot can be made at or near a corner of the bundle and yet the entire bundle can be disposed within the sweep of the twine arm. Where, however, the bundle is to be moved by a conveyor in a direction parallel with the twine arm axis and toward the twine arm support, it becomes necessary to place the bundle on the opposite side of the knotter to avoid having the bundle strike the twine arm support as it leaves the machine. This extends the bundle beyond the normal sweep of the twine arm and makes necessary a special longer arm, which is undesirable.

Another object of this invention is the provision of a support for a bundle to be tied wherein said bundle, though located on the outside of the knotter relative to the twine arm support, is nevertheless within the sweep of a normal tying machine twine arm, thereby making a longer twine arm unnecessary.

Yet another object of this invention is to provide a push-type conveyor for pushing bundles to be tied past two or more tying machines, said conveyor having an intermittent drive to permit the tying machines to perform their functions while the bundles are stationary, with means for adjusting the point relative to the tying machines at which the conveyor stops, to accommodate bundles of different sizes.

It is also within the purview of this invention to provide a push-type conveyor in which means are provided to stop the conveyor at any one of an infinite number of locations when a pusher encounters an obstruction to the forward movement of the conveyor.

Other objects include the provision of novel means for adjusting the location of the bundle-holding trough of the conveyor relative to the tying machine tables, for adjusting the supports for the driving chain for the conveyor to take up for wear and for proper alignment, and for compressing the bundles while they are being tied.

These and other objects of this invention will become apparent from the following description when taken together with the accompanying drawings in which.

It is contemplated that the conveyorized system of this invention may be adapted for tying bundles of various kinds of flat articles and that therefore the tying machines, conveyor pushers, bundle compressors, power source and controls will all be mounted on a single frame which may be handled as a unit. Various forms of feed conveyors may be used to bring the stacks of articles to be tied to the unit and such feed conveyors will not be disclosed herein. The unit may be mounted on wheels for ease in changing its location and furnished with adjustable pads that may be lowered to fix the unit in place. The conveyor is of the pushed type and is comprised of a pair of endless chains which move in parallel horizontal planes and are driven from sprockets rotating about a vertical axis. Thus one end of the unit is the input end where the pushers move behind a stack to be tied and push the stack intermittently through a trough. At certain locations in the trough the latter is replaced by elements of, first, the long tie machine and second, one or more cross-tie machines, the segments of the trough thus created being always in alignment. At the exit end, the tied bundles are either dropped into receptacles for shipment, or are conveyed by any suitable means to another area.

Figure 1:
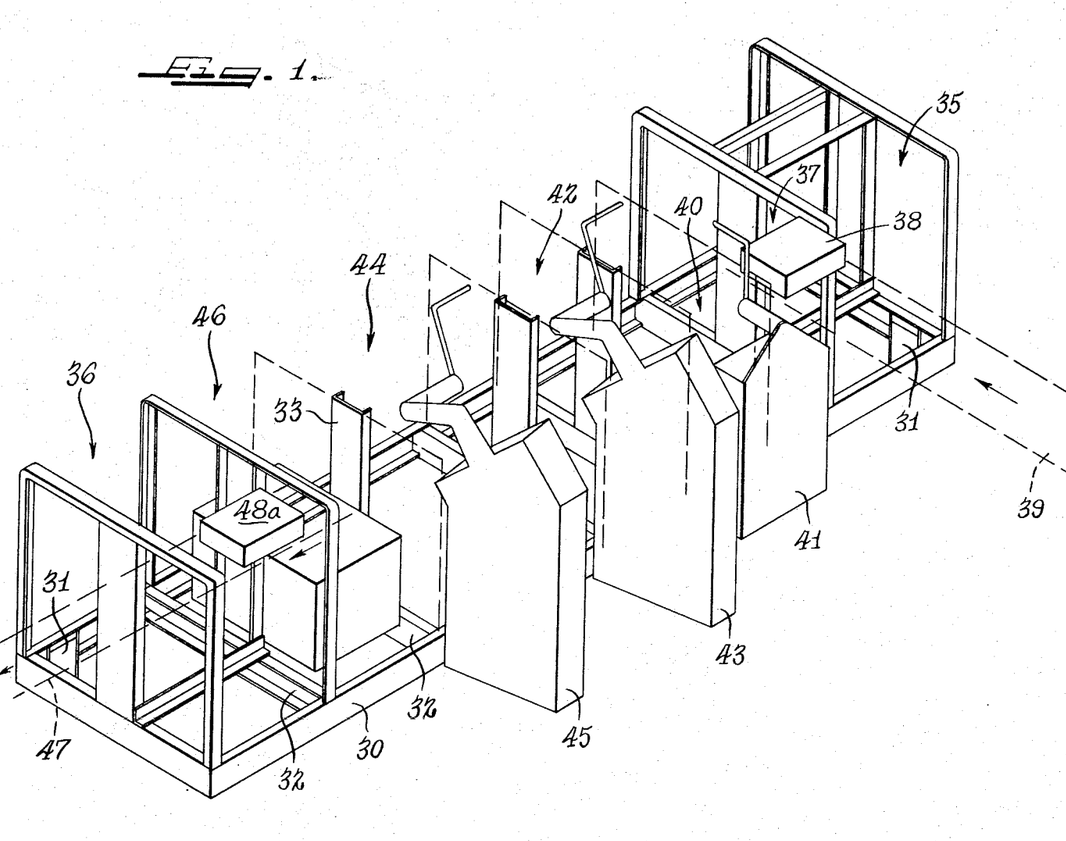
FIG. 1 is a perspective view of the frame of the conveyorized system of this invention showing schematically the tying machines mounted thereon.

Referring now to the drawings and particularly to FIG. 1, the entire system is shown mounted on a single rectangular frame 30 made of channel irons appropriately welded together and reinforced by angular braces 31 and spaced transverse members 32. Upright channels 33 are appropriately welded or otherwise secured to the transverse members and serve, as will hereinafter be made clear, to support drive chains for the pusher conveyor shown schematically at 34 in FIG. 2. Frame 30 is divided into end bays 35, 36 wherein the conveyor is turned through 180° to reverse its movement, a loading bay 37 through which bundles 38 of magazines or the like to be tied are introduced to the unit from a loading conveyor 39, a tying machine bay 40 at which is stationed the long tie tying machine 41, and a cross-tie bay 42 in which is stationed the typing machine 43 for tying cross-ties on the bundle. Next, in the embodiment selected to illustrate this invention, is a second cross-tie bay 44 in which is stationed the second cross-tie machine 45 followed by a power bay 46 containing the drive mechanism for the pusher conveyor (FIG. 22) and the aforementioned end bay 36 in which the conveyor is again turned through 180°. The exit end of the pusher conveyor may contact with a short length of a transfer conveyor shown dotted at 47 which moves the tied bundles 48a out of the unit and either upon another conveyor (not shown) or into a waiting receptacle (not shown).

Figures 2, 3:
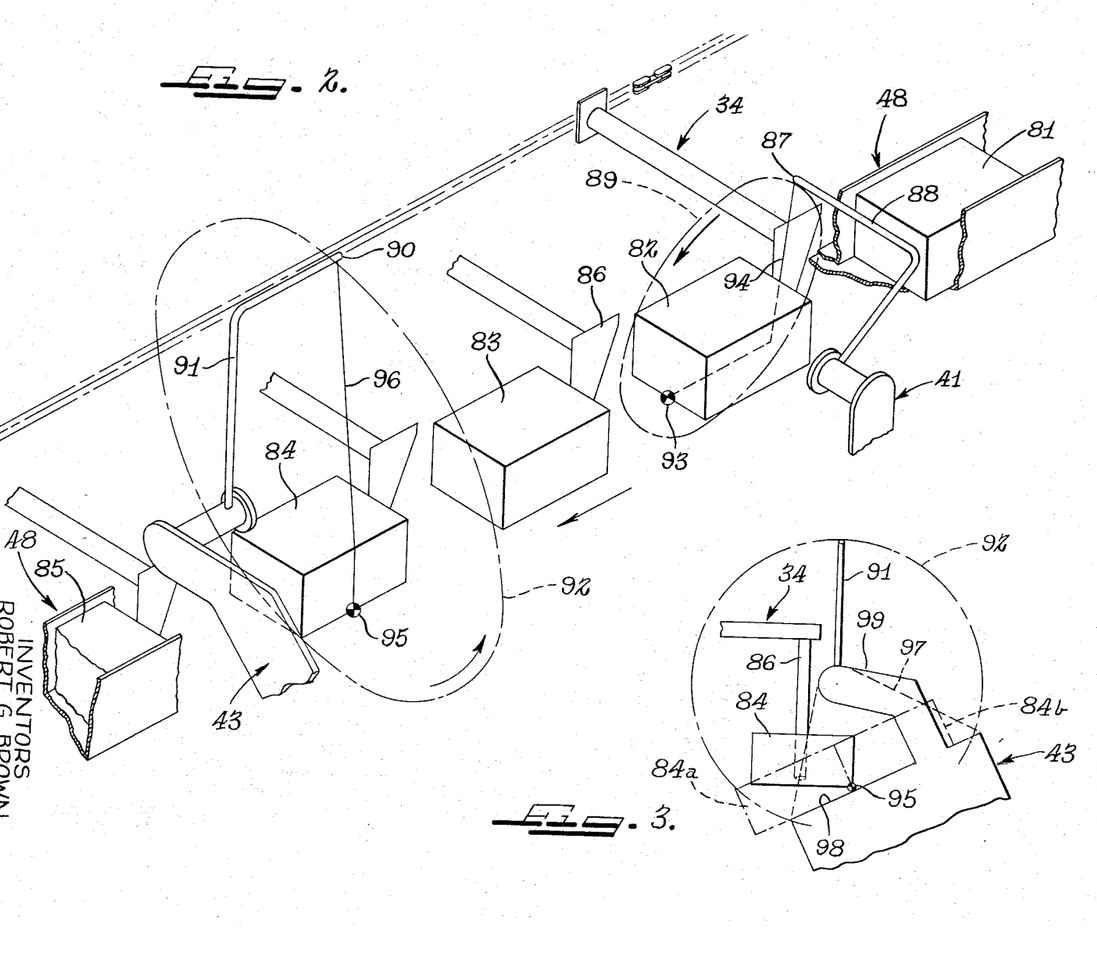
FIG. 2 is an enlarged schematic perspective view of the tying machines in the process of tying bundles.
FIG. 3 is a schematic end elevational view of a tying machine showing the novel relationship of the bundle and tying machine by which wider bundles may be accommodated in the same tying machine.

The direction of movement of the bundles through the unit is determined by a trough 48 shown schematically in FIG. 2 and in greater detail in FIGS. 9–12. Said trough is comprised of individual sections 49–53 (FIG. 12) disposed in end-to-end relation to one another. Section 49 includes the long tie station, section 50 includes the first short tie station, section 51 is a connecting section between the first and second cross-tie stations, section 52 is the second cross-tie station and the section 53 is the exit section leading to transfer conveyor 47. Each section is comprised of a sheet metal bottom panel 54, a vertical side panel 55 and a vertical side panel 56 spaced from and parallel with side panel 55.

Figure 14:
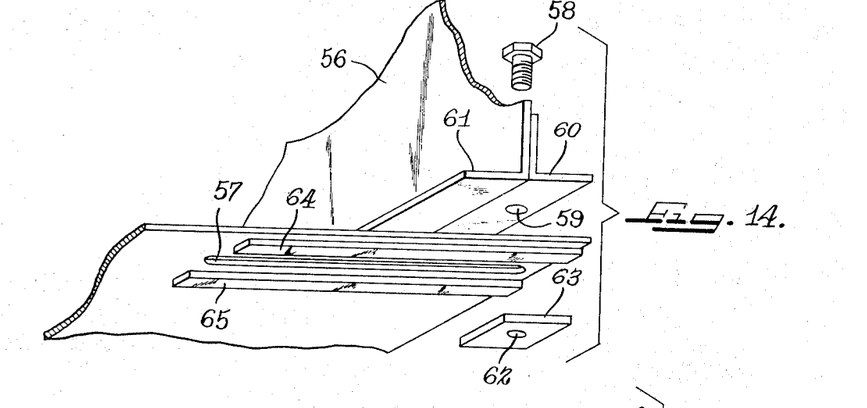
FIG. 14 is an exploded view of the portion of the adjusting means for the trough shown in the circle 14 in FIG. 12.
Figure 15:
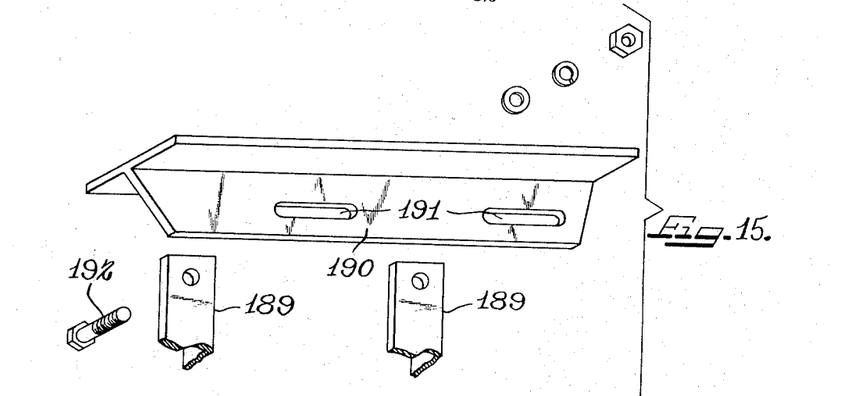
FIG. 15 is an exploded view of a portion of the support for the sides of the trough of FIG. 13.
Figure 16:
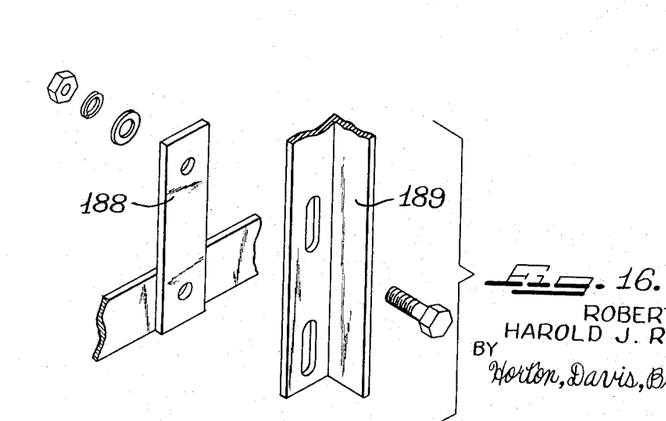
FIG. 16 is an exploded view of the adjustable portion of the support for the bottom of the trough of FIG. 13.

Since one batch of articles to be tied in the unit may differ in width from another batch, means are provided for changing the spacing between the side panels 55 and 56. This means comprises slots 57 in the bottom panel 54 (FIG. 14) through which extend screw type fasteners such as bolt 58, the latter in turn passing through an opening 59 in a reinforcing angle iron 60 welded or otherwise secured to the rear bottom region of side panel 56. A flange 61 is formed on panel 56 at the base thereof and in the same plane as the horizontal portion of angle iron 60 to provide a broad support for side panel 56 on bottom panel 54. Said bolt 58 engages a threaded opening 62 in a rectangular guide 63 which is adapted to slide between parallel straps 64, 65 disposed one one either side of slot 57. It may be understood that the foregoing construction obtains at all of the slots 57 shown in FIG. 12 so that all of the sections 49–53 may be adjusted to the same spacing between side panels 55 and 56.

Figure 9:
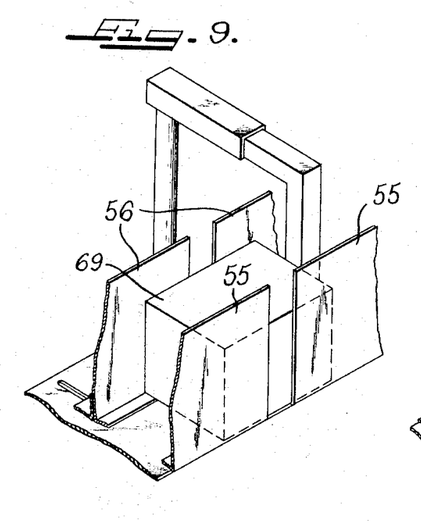
FIGS. 9 and 10 are schematic perspectives of a fragment of the conveyor trough showing its adjustability to various sizes of bundles.
Figure 10:
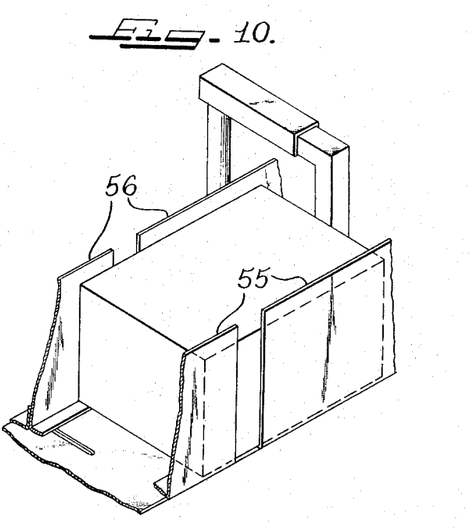

The adjustability of the trough is illustrated in FIGS. 9 and 10. FIG. 9 shows side panels 56 moved toward side panels 55 to accommodate a bundle 69 of narrow magazines, envelopes, or the like, and FIG. 10 shows side panels 56 moved away from side panels 55 to accommodate a bundle 70 of wider magazines, envelopes, or the like. Various intermediate adjustments are, of course, possible.

Figure 11:
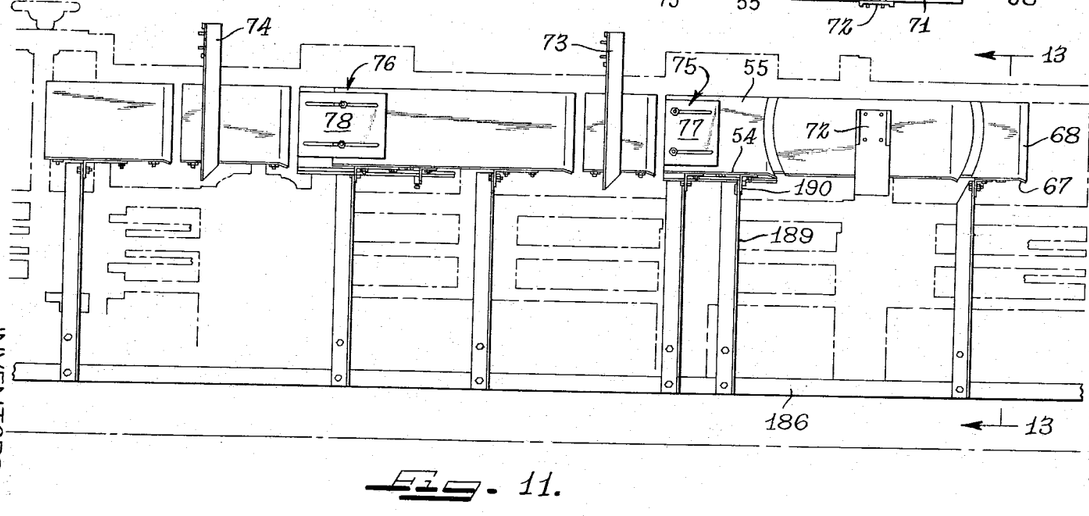
FIG. 11 is an elevational view of the central portion of the frame showing the conveyor trough.
Figure 12:
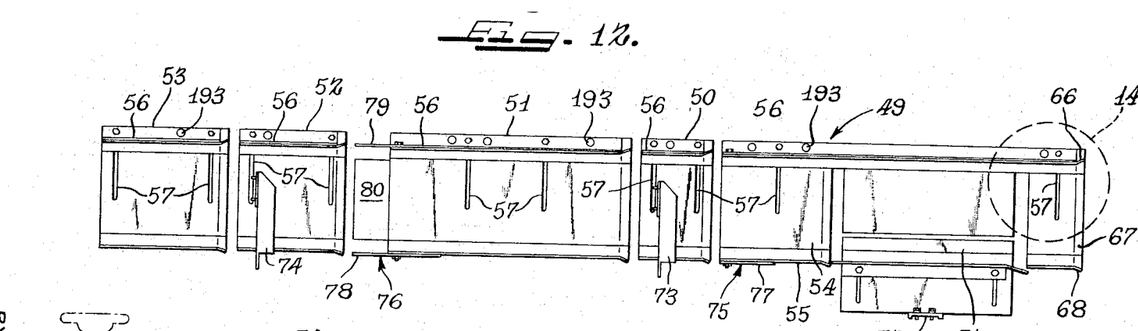
FIG. 12 is a plan view of the conveyor trough of FIG. 11.
Figure 13:
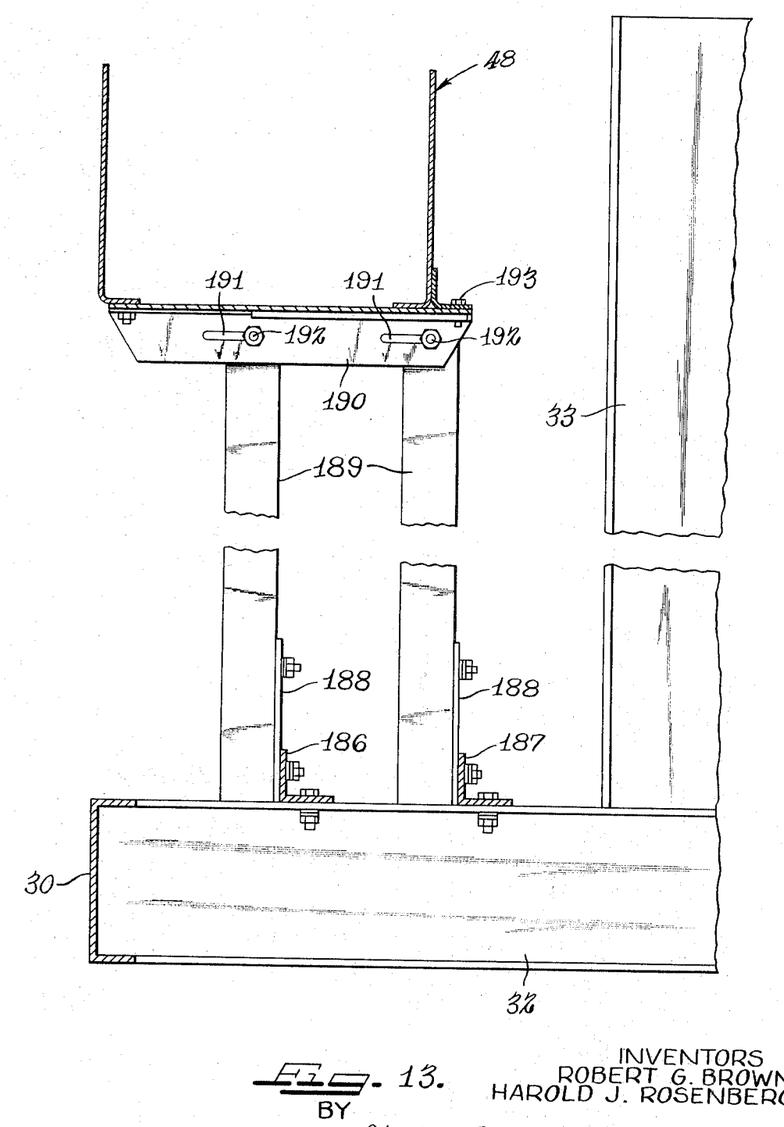
FIG. 13 is a section through the frame and trough of FIG. 11 taken along line 13—13 and looking in the direction of the arrows at the ends thereof.

The movement of the articles to be tied is from right to left in FIGS. 11 and 12, and accordingly the right-hand end of each section 49–53 is the entrance end thereof. To avoid catching a possibly downward or sideward protruding edge of an article of which the bundle is comprised upon the entrance end of a section, the bottom and side panels have outwardly flared end regions 66, 67, 68, which guide such protruding edges back into the section.

The division of the trough into a plurality of individual aligned sections is necessitated by the requirement that the twine arm of the tying machine which wraps and knots a reach of twine around the bundle must pass through the trough to complete its cycle. The tying machines and their twine arms are not shown in detail, since these essential elements are standard, or modifications readily made by men skilled in the art, the standard elements being shown, for example, in B. H. Bunn Patent No. 1,606,290 dated Nov. 9, 1926, for Tying Machine. In such standard tying machines the table on which the bundle to be tied is supported is made in two adjacent parts, one of which is fixed to the machine frame and the other of which is suspended from the twine arm shaft and is disposed within the sweep of the twine arm. Thus section 49 has a part 71 therein which is separate from section 49 and has a vertical support 72 which is suspended from the twine arm shaft of the long tie machine for loose swinging movement about the shaft axis. Similarly, section 50 is suspended in its entirety by a supporting arm 73 from the twine arm shaft of the first cross-tie machine and section 52 is suspended in its entirety by a supporting arm 74 from the twine arm shaft of the second cross-tie machine.

Inasmuch as the length of the bundles may vary between batches, and hence the spacing between cross-ties may likewise vary, the dimensions of the suspended sections 50 and 52 lengthwise of the trough may likewise vary, which would leave gaps between these suspended sections and the fixed sections 49 and 51. To close these gaps, adjustable extensions 75 and 76 are provided on said fixed sections 49 and 51, said extensions comprising slotted side plates 77, 78, 79 and a bottom plate 80. Said extensions may be moved lengthwise of the trough to the limit of the slots therein to close or reduce the size of said gaps.

The support for the trough is shown in FIGS. 11, 13, 15 and 16. Frame 30 has parallel angle irons 187, 187 mounted longitudinally on the cross members 32 to which are welded vertically disposed strips 188 appropriately spaced to support the fixed sections 49, 51 and 53 of trough 49. To strips 188 are secured vertically disposed angle irons 189 the tops of which are connected by transverse angle irons 190 which are slotted as at 191 to receive through bolts 192 which fasten the upper ends of the vertical angle irons 189 to the transverse angle irons. Slots 191 allow a lateral adjustment of the position of transverse angle iron 190 relative to the vertical angle irons.

Transverse angle irons 190 serve as supports for the fixed trough sections 49, 51 and 53, to which the bottoms (but not the rear panels 56 and angle irons 60) are secured by bolts 193.

The disposition of the first two tying machines relative to the trough is shown schematically in FIG. 2. The third tying machine, i.e., the second cross-tie machine, is not shown since it is disposed in substantially the same way as the first cross-tie machine. In this figure a series of bundles 81–85 is shown disposed in the trough 48 in spaced relation to one another as determined by the spacing between adjacent arms 86 of the pusher conveyor 34. The circle described by the end 87 of the twine arm 88 of the long tie tying machine 41 is shown at 89, and the circle described by the end 90 of the twine arm 91 of the first cross-tie tying machine 43 is shown at 92. The approximate position of the knotter of tying machine 41 is shown at 93 and the twine being wrapped around bundle 82 on machine 41 is shown at 94. Similarly, the position of the knotter of tying machine 43 is shown approximately at 95 and the twine being wrapped around bundle 84 on machine 43 is shown at 96. It may be noted that circle 89 is in a plane located at right angle to the plane of circle 92 and that the direction of movement of bundle 82 relative to long-tie machine 41 is a customary or entirely usual one, whereas the movement of bundle 84 relative to cross-tie machine 43 is one for which the normal tying machine is not designed.

The problem posed by the unorthodox movement of bundle 84 is illustrated in FIG. 3. The usual support for twine arm 91 is an A-frame shown dotted at 97. The tying machine is constructed to accept bundles on a plane reference surface which bears a predetermined relation to the knotter mechanism of the machine so that the knot will be firm and the twine taut. This plane reference surface coincides with the table 98 usually supplied with each machine to support an article while a bundle is being tied. It is obvious that if bundle 84 were placed upon the normal table 98 of machine 43 and moved toward the A-frame, the bundle would be stopped thereby, since the A-frame would be in the way. Some relief can be obtained in this situation by changing the A-frame to an offset arm 99 which then clears the way for the bundle to pass through as shown dotted at 84a. It is essential, however, that the knot 95 be disposed at a lower corner of the bundle, which then causes the bundle to extend outwardly beyond the circle 92 described by the twine arm and creates interference therebetween. The twine arm can be lengthened, of course, to avoid the bundle, but this creates undesirable inertia forces and makes necessary the provision of additional space for the machine. Another alternative is to shift the bundle to the opposite side of knotter 95 as shown at 84b, but this again creates interference between the bundle and the off-set arm 99. Furthermore, in the last-mentioned alternative, as indeed in all forms, provision must be made for the pusher to pass the twine arm support, and it would be difficult, without a specially shaped pusher, to push bundle 84b past the off-set twine arm 99.

The novel disposition of the bundle 84 relative to twine arm 91 and off-set twine arm support 99, according to this invention, is shown in solid lines in FIG. 3. In this disposition, bundle 84 remains in the horizontal position it assumed in the trough at the long-tie machine 41, but the cross-tie machine, in addition to having an off-set twine arm support, has been tilted on its side through an angle not exceeding 25° with the horizontal. This brings bundle 84 well within the sweep of twine arm 91 without changing the length of the arm, and allows the bundle-contacting arm 86 of the conveyor 34 to push the bundle reasonably centrally of the bundle while at the same time safely passing by off-set twine arm support 99.

Figure 4:
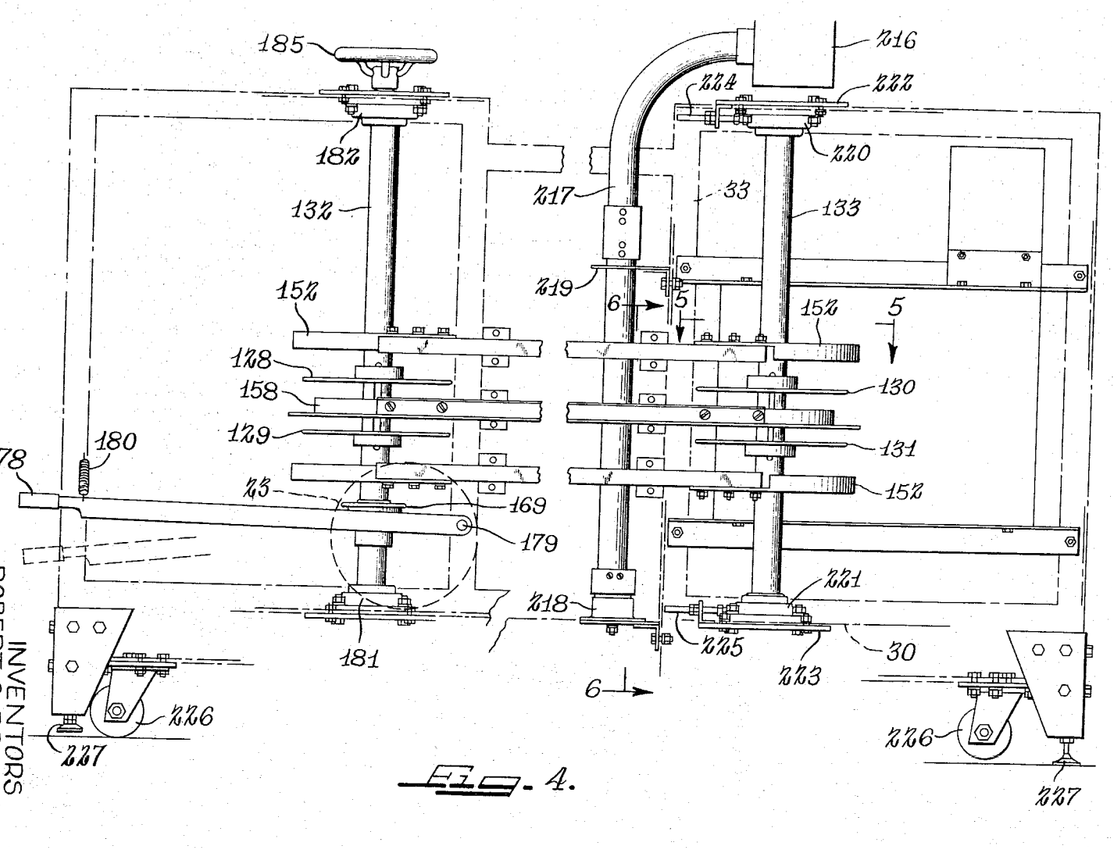
FIG. 4 is a side elevational view of the ends of the machine with emphasis on the drive chains and supports therefor.
Figure 17:
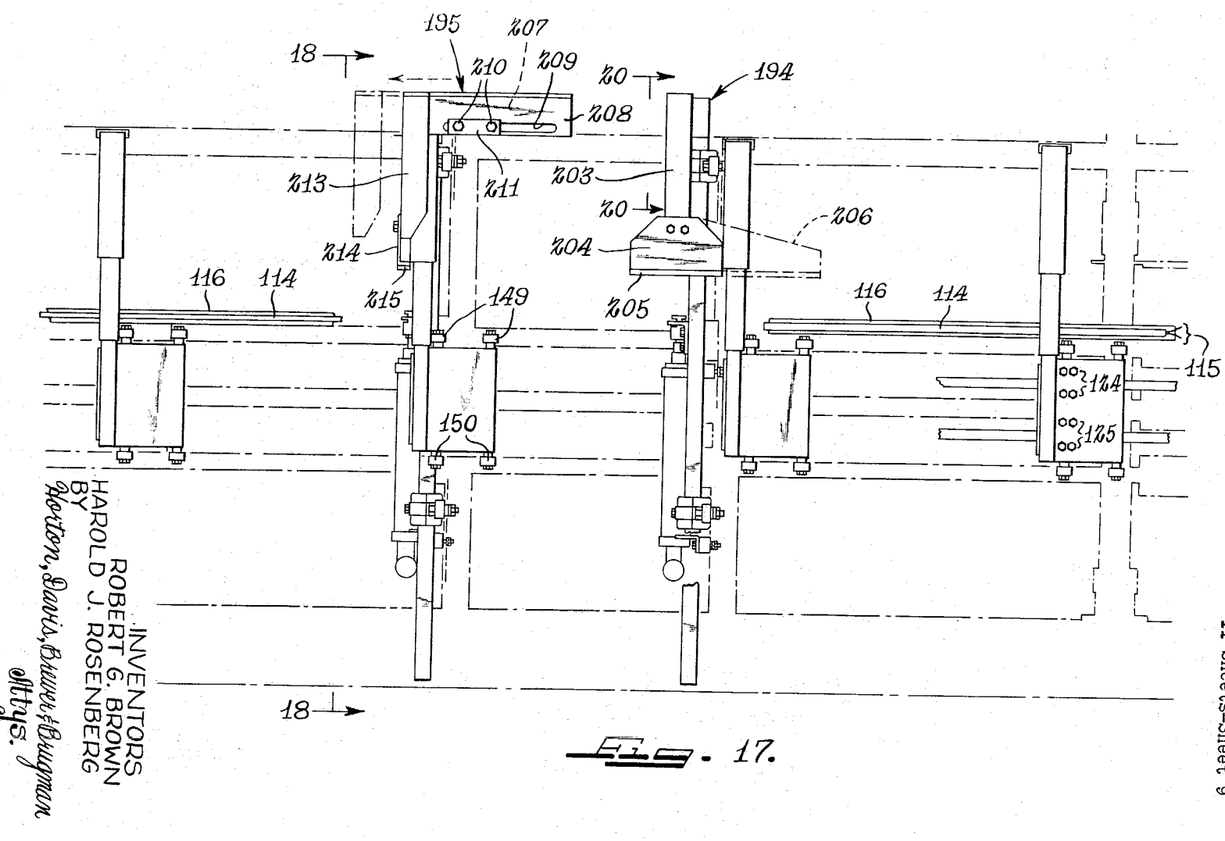
FIG. 17 is a side elevational view of the conveyor pushers and the bundle compressors.
Figures 18, 19, 20, 21:
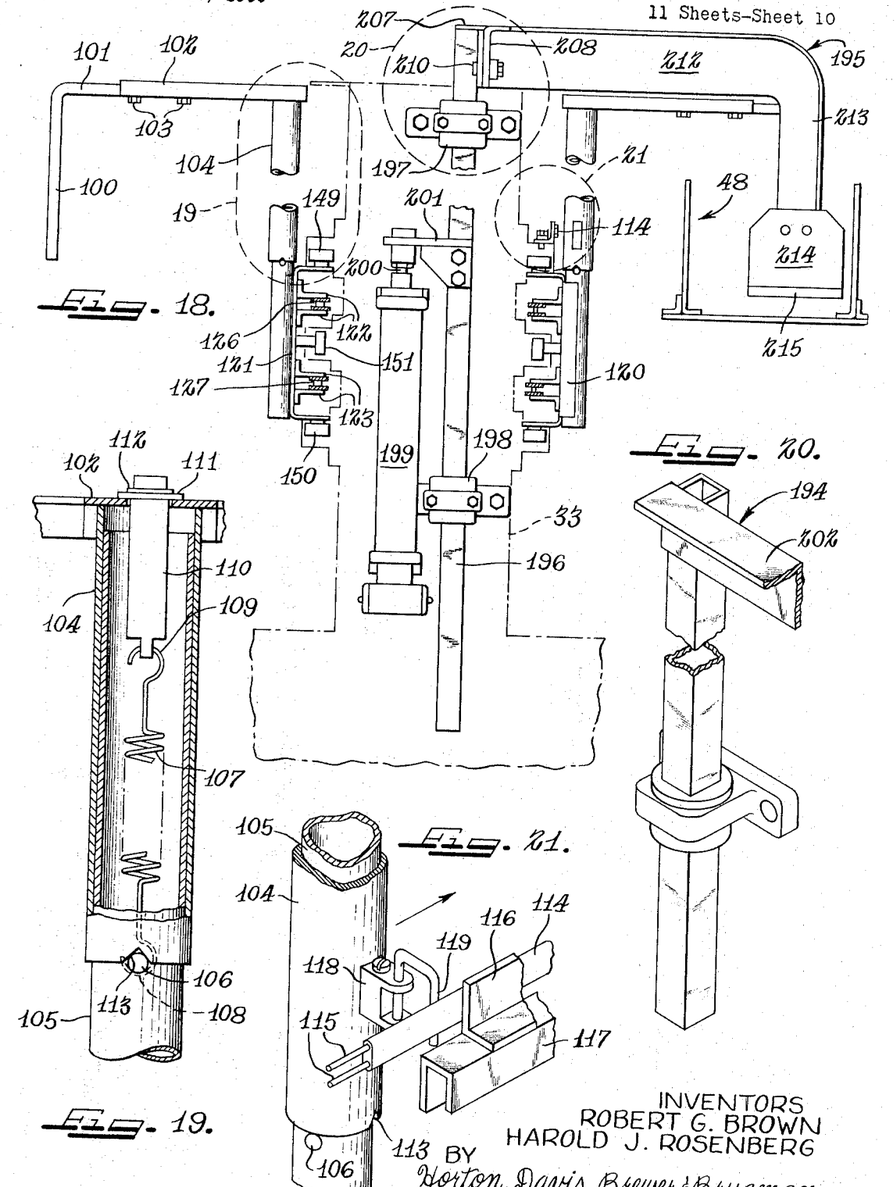
FIG. 18 is a section through the conveyor pushers and bundle compressors taken along line 18—18 of FIG. 17 and looking in the direction of the arrows at the ends thereof.
FIG. 19 is an enlarged fragmentary section through the portion of the pusher shown in the circle 19 in FIG. 18.
FIG. 20 is a fragmentary, enlarged perspective of the upper portion of the bundle compressor shown in the circle 20 in FIG. 18.
FIG. 21 is a fragmentary enlarged perspective of the portion of the pusher shown in the circle 21 in FIG. 18.

The principal elements of the pusher conveyor are shown in FIGS. 4, 17 and 18. FIG. 4 shows the "turn-around" end sections of the conveyor, FIG. 17 shows the central section, and FIG. 18 shows the details of the conveyor support. A plurality of pushers is used, each bundle being moved through the trough 48 by an individual pusher. The spacing between pushers is such that three bundles can be tied simultaneously, one with a long tie, the second with a cross-tie, and the last with a second cross-tie, each bundle being accurately located with respect to its tying machine to produce ties at predetermined locations on the bundle. Each pusher is comprised of an L-shaped rod or tube 100 disposed with one leg vertical and the other leg 101 horizontal, the latter extending into a channel 102 to which it is secured by screws 103. Leg 101 may have slots (not shown) therein to receive screws 103 whereby the location of the vertical leg relative to channel 102 may be adjusted to accommodate bundles of different width. Channel 102 is in turn welded or otherwise secured to a vertical tube 104 which is telescoped over the upper end of a cylindrical post 105 and held against a pin 106 extending through post 105 by a tension spring 107. Said spring 107 has one end 108 hooked around pin 106 and its other end 109 hooked into an abutment 110 passing through channel 102 and held thereagainst by a washer 111 and a snap ring 112.

It is contemplated that when pusher rod 100 encounters a resistance created by a jammed bundle which cannot move through trough 48, or by another malfunction of the apparatus, it will yield by turning on post 105 and in so doing will operate, or set into operation, a cut-out switch for the entire unit. To this end, pin 106 is received in a notch 113 formed in the lower end of tube 104, so that under normal operating conditions the troque developed in tube 105 by pusher 100 will not be sufficient to cam pin 106 out of notch 113, but upon encountering an unusual resistance, pusher 100 will develop sufficient torque to cam pin 106 out of notch 113 and tube 104 will then turn on post 105. The release torque is determined by the tension in spring 107 and this tension may be varied by changing the length of abutment 110.

The means for producing an electrical signal which may be used to set in operation a cut-out switch is shown in FIGS. 17, 18 and 21. It may be observed that an unusual obstruction to the movement of pusher 100 will occur only in the operation flight of conveyor 34, and the signal-producing means may be limited to just that side of the conveyor. The signal-producing means is a well-known ribbon or strip switch 114 which contains a pair of conductors 115 which are connected together upon compressing the strip at any point along its length. Said strip switch 114 is suitably secured by adhesive or otherwise to an angle member 116 bolted to the top of a channel 117 forming part of the conveyor and hereinafter described in detail. On tube 104 is welded a bracket 118 in which is mounted a U-shaped spring finger 119. The disposition of bracket 118 and finger 119 on tube 104 is such that normally finger 119 is out of contact with strip switch 114, but upon the turning of tube 104, finger 119 strikes strip switch 114 and compresses it against angle member 116, thereby establishing a connection between conductors 115 and producing, in combination with suitable electrical means, a signal which is utilized to operate a cut-out switch. Since strip 114 is coextensive with the operative flight of the conveyor, the cut-out can be effected at any point along this flight. Furthermore, since each pusher 100 is equipped with the finger 119, pin 106 and notch 113, the cut-out can be made operative by any pusher on the conveyor.

Each post 105 is mounted upon the forward end 120 (FIGS. 17, 18) of a vertical plate 121. Said end 120, as shown in FIG. 18, is curved to match the curvature of the outer surface of post 105 so that approximately 90° of surface-to-surface contact is developed between the plate and post to make possible a firm welded joint which holds the post in fixed position relative to the plate. Each plate is provided with pairs of spaced brackets 122, 123, secured thereto by bolts 124, 125, and each bracket is secured to a link in endless drive chains 126, 172, respectively, which pass around drive sprockets 128, 129 (FIG. 4) and reversing sprockets 130, 131 mounted on shafts 132 and 133.

The continuous support for plates 121 is provided by appropriate rollers and channels shown more clearly in FIGS. 5-8 and 18. The upright channels 33 on frame 30 (FIG. 1) are provided with three vertically spaced angle brackets 134, 135, 136 on one flight side and three vertically spaced angle brackets 137, 138, 139 on the other flight side. Each bracket is formed with slotted openings 140 through which bolts such as 141 may pass to secure the bracket to the upright channel 33. The openings in the top and bottom brackets (134, 137 and 136, 139) are vertically disposed to provide a vertical adjustment for the brackets on the channels 33 and the openings in the middle brackets (135, 138) are horizontally disposed to provide a horizontal adjustment of these brackets on the channels 33. Each bracket supports a channel member 142-146, each of which channel members 142-146 is substantially identical to channel member 117. Upper channel members 142 and 117 have their open side facing downward, middle channel members 143, 145 have their open sides facing outward, and lower channel members 144 and 146 have their open sides facing upward. Each channel member 117, 142-146 is secured to an angle bracket 134-139 by bolts 141 passing through slotted openings 147 therein and through suitable openings in plates 148 welded to the channels. Openings 147 are slotted horizontally to provide a horizontal adjustment between angle brackets 134-139 and plates 148.

Figures 5, 6, 7, 8:
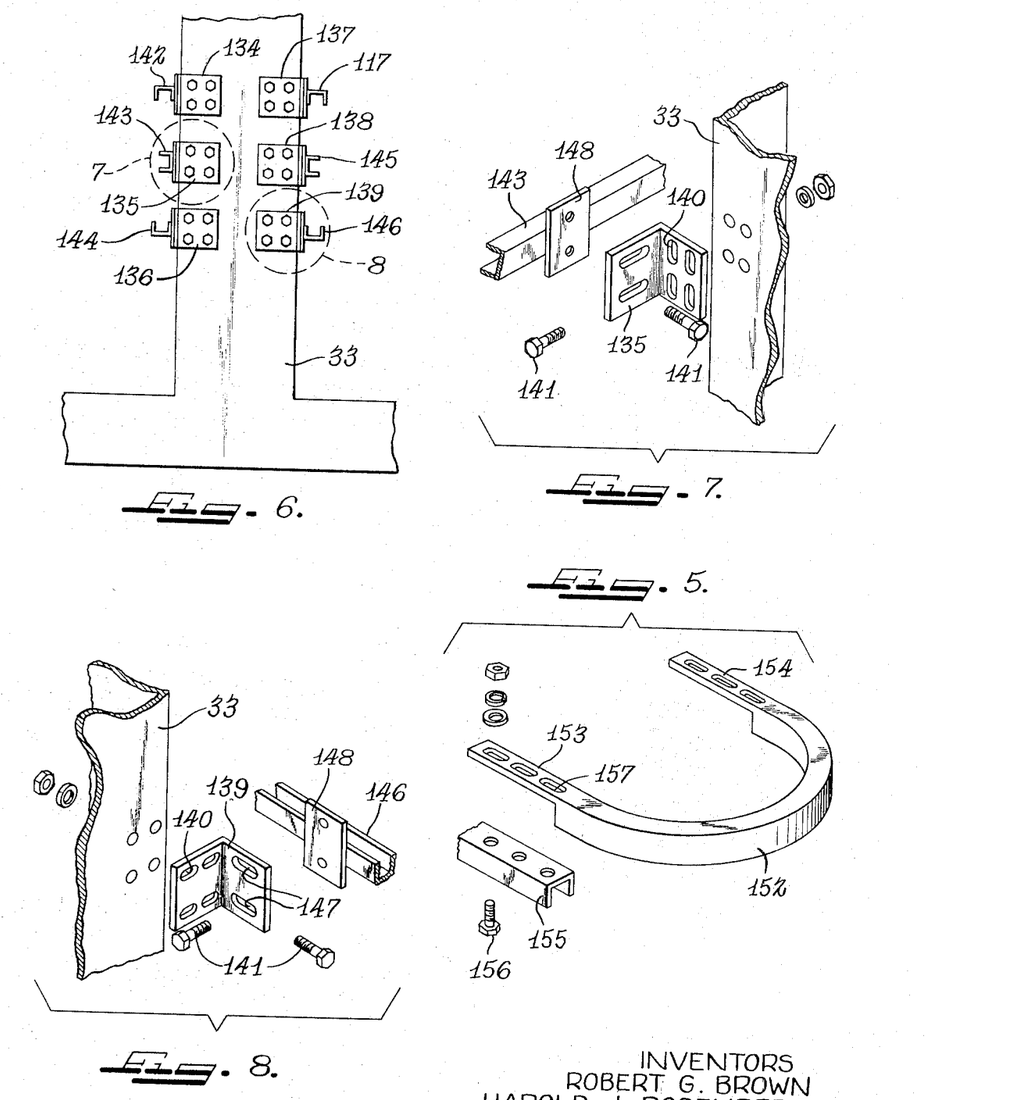
FIG. 5 is an exploded view of the portion of FIG. 4 designated by the line 5—5 and looking in the direction of the arrows at the end thereof.
FIG. 6 is a fragmentary end elevation of a portion of the frame of FIG. 4 taken along line 6—6 thereof.
FIG. 7 is an exploded and enlarged view of that portion of FIG. 6 within the circle 7 in FIG. 6.
FIG. 8 is an exploded and enlarged view of that portion of FIG. 6 within the circle 8 in FIG. 6.

Each channel 117, 142-146 is a track for supporting and guiding a roller secured to a post supporting plate 121. Thus, as shown in FIG. 18, each plate 121 has upper and lower rollers 149, 150 rotatable about vertical axes and a central roller 151 rotatable about a horizontal axis. Upper roller 149 is received in tracks 117 and 142, central roller in tracks 143 and 145, and lower roller 150 is received in tracks 144 and 146. Suitable reversing tracks are provided in the end bays 35 and 36 to lead the rollers from the tracks on one side of channels 33 to the tracks on the other side of said channel. Thus, as shown in FIG. 5, the upper channels 117, 142 are connected by a semi-circular channel 152, the ends of which terminate in strips 153, 154 which overlap the ends 155 of the channels 117 and 142 and to which they are secured by suitable bolts 156. The bolt openings 157 in the strips may be elongated to provide a lengthwise adjustment of the semi-circular channel 152. A semi-circular channel, inverted, may be used to connect channels 144 and 146. The central channels 143 and 145 may be connected by a simple semi-circular angle iron 158 (FIG. 4).

It may be apparent that rollers 149 and 150 guide plate 121 and the associated pusher 100 laterally of frame upright channels 33 and rollers 151 support the plate and pusher vertically. Two sets of rollers are provided for each plate as indicated in FIGS. 17 and 22 to prevent turning of plate 121 about the axes of rollers 149 and 150 by the resistance of a bundle upon pusher 100.

Figure 22:
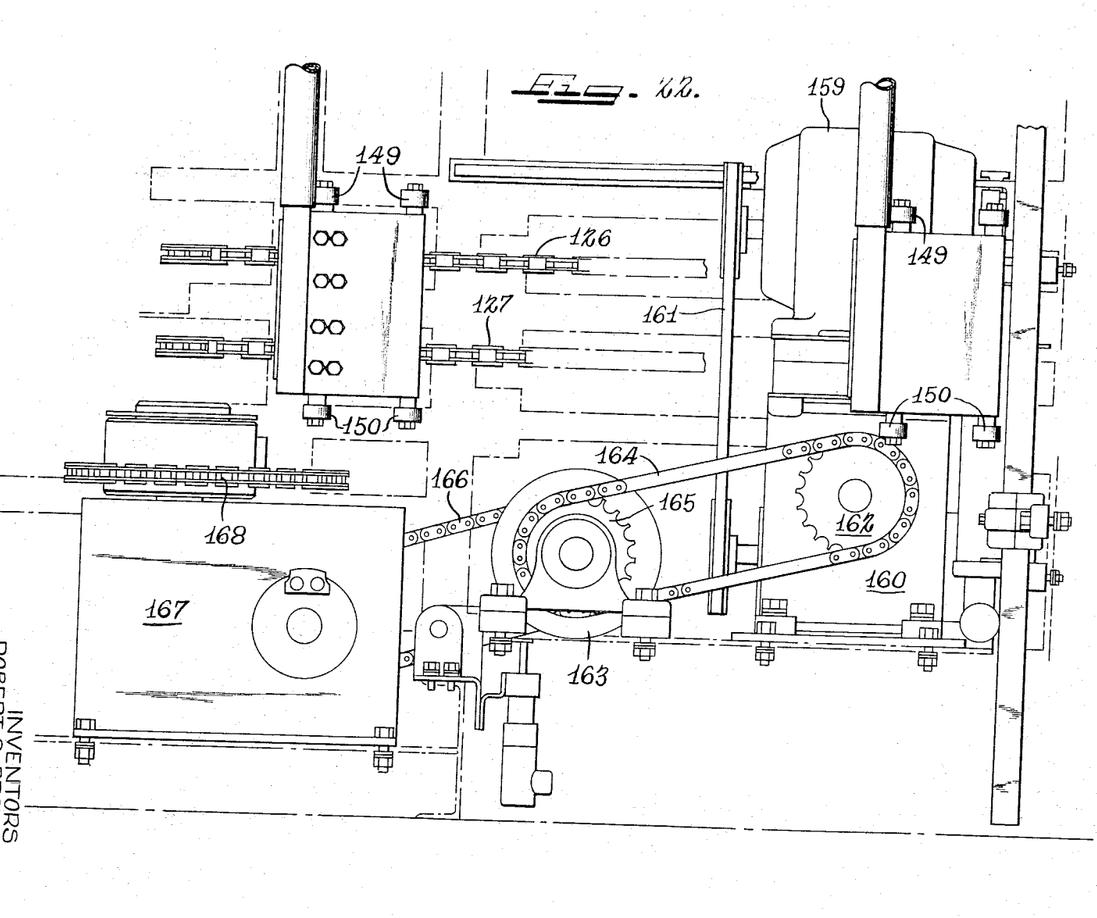
FIG. 22 is an enlarged side elevational view of the drive mechanism for the pushers which is mounted on the left hand end of the frame of FIG. 4.
Figure 23:
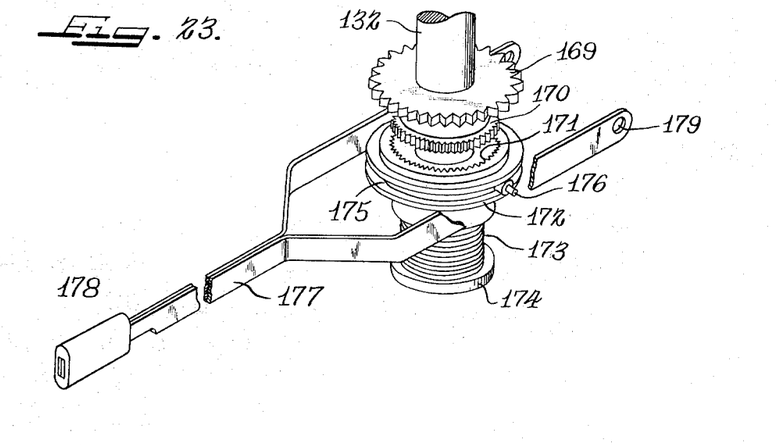
FIG. 23 is an enlarged perspective of the clutch mechanism for the pusher drive mechanism shown in the circle 23 in FIG. 4.

The drive for chains 126, 127 is shown in FIGS. 22 and 23. Said drive is located in the power bay 46 and comprises an electric motor 159 which drives a gear reduction unit 160 through a belt 161. The motor and gear reducer may be any of the commercially available motor-reducer units wherein the motor is mounted directly upon the reducer. The output of the reducer is a sprocket 162 which drives a commercially available single revolution clutch 163 through a chain 164 and sprocket 165. Said clutch 163 in turn drives through a chain 166, a commercially available indexing unit 167 which controls the acceleration and deceleration of the conveyor. The output of the indexing unit is a chain drive 168 which drives the input sprocket 169 (FIG. 23) of a jaw clutch on shaft 132 which drives sprockets 128 and 129 for conveyor chains 126 and 127. Input sprocket 169 is loose on shaft 132 and is formed with external clutch teeth 170 adapted to be engaged by the internal clutch teeth 171 formed on an axially slidable clutch collar 172. Said collar is normally held in engagement with teeth 170 by a spring 173 compressed between collar 172 and a fixed abutment 174.

Collar 172 has an external groove 175 in which rides a yoke 176 forming part of a foot-operated lever 177 which has a pedal 178 (FIG. 4) extending out of end bay 36 where it may be readily accessible to the operator of the machine. Lever 177 is pivoted to a channel 33 at 179 and has a counterbalance spring 180 for counteracting the weight of said lever.

Shaft 132 is supported for rotation in lower bearing 181 (FIG. 4) and upper bearing 182 secured to plates 183 and 184, respectively, on frame 30. Shaft 132 extends through upper bearing 182 and has a hand wheel 185 secured to it for manually rotating shaft 132 when clutch teeth 170 and 171 are disengaged. The purpose of the manual operation of shaft 132 is to change the phase relation of the pushers relative to the drive mechanism when the length of the bundle in the trough changes so that the ties can still be made as required. The bundles are indexed from the front edges thereof, i.e., the front edges of the bundles regardless of their length must occupy a predetermined position relative to the knotters of the tying machines. Since the bundles are advanced by the pushers which are behind the bundles, an adjustment such as that provided by hand wheel 185 and clutch teeth 170, 171 is necessary when the bundle size is changed. The adjustment is effected by depressing pedal 178 to disengage clutch teeth 170, 171 and, while the pedal is depressed, hand wheel 185 is turned in the appropriate direction to move the pusher independently of the drive therefor until the required phase relation is established, whereupon pedal 178 is released to allow teeth 170, 171 to interengage and restore the drive.

During a tying cycle, it is desirable to compress the bundle to assure a tight knot. The compressing function in the device illustrated herein is performed by compactors which are raised when bundles are in motion, and are lowered by pneumatically operated cylinders. Two such compactors are shown in FIG. 17 at 194 and 195 for cooperation with the fixed portion of trough 49 adjacent tying machines 41 and 43 respectively. It is understood that a third compactor (not shown) may be used with the third tying machine if the bundle is such that the long and cross ties already made on the bundle do not compact it sufficiently for the third tie.

The details of construction of the compactors 194 and 195 are shown in FIGS. 18 and 20. Certain portions of both compactors are identical, the differences residing in the disposition and construction of the portion which actually contacts the bundle. Each compactor has a vertically disposed square tube 196 which is secured for reciprocating, nonrotative movement in the upper and lower square guides 197, 198 bolted to an upright channel 33 of frame 30. A conventional pneumatically operated cylinder 199 is secured to channel 33, and its piston rod 200 is connected by a bracket 201 to the side of square tube 196 so that tube 196 is compelled to move with piston rod 200.

The upper end of tube 196 for compactor 194 is welded or otherwise secured to one end of a horizontally extending angle iron 202 the outer end 203 (FIG. 17) of which is bent downward into the trough 48. A plate 204 having a horizontal flange or foot 205 is secured to the end 203 and constitutes the bundle-contacting portion of the compactor. The length of the plate 204 is such as to overlie the central regions of a bundle adjacent the path taken by the twine as it is wound around the bundle. For longer articles, a longer plate (shown dotted at 206) may be substituted for plate 204.

The construction of the compactor for the cross tie is different from that for the long tie in that the location of the cross tie relative to the trough may be changed, thereby making necessary a shift in the location of the compactor along the trough. Compactor 195 is therefore constructed to be shiftable longitudinally of the trough and is comprised of a longitudinally disposed angle iron 207 which is welded or otherwise secured to the upper end of tube 196. A second angle iron 208 overlies the first angle iron 207 and is provided with a longitudinal shot 209 through which extend bolts 210 from angle iron 207. A strap 211 straddles slot 209, and angle iron 208 is thus clamped between strap 211 and angle iron 207 by said bolts 210.

A transverse angle iron 212 is secured to angle iron 208, sand angle iron 212 having a downwardly bent end 213 to which is secured a plate 214 having a horizontally disposed flange or foot 215 which is adapted to contact a bundle and compress it against the bottom of the trough 48.

Except for the control shown in FIG. 21, the controls for the various functions of the device are comprised of strategically located microswitches and photoelectric cells operated by contact with the bundle or moving parts of the device, or by manually controlled switches. The latter are mounted on a box 216 (FIG. 4) supported by a bent conduit 217 which swivels on a threaded flange fitting 218 secured to frame 30. The upper end of conduit 217 passes through a bracket 219 secured to an upright channel 33. The bent and swivelled construction of conduit 217 allows box 216 to be swung to either side of the frame 30 and thus makes the controls in box 216 accessible from either side of the device.

Slack in the drive chains 126 may be taken up by shifting shaft 133 relative to shaft 132. As shown in FIG. 4, shaft 133 is supported in bearings 220 and 221 which are mounted on plates 222 and 223 respectively through slotted connections (not shown). Conventional adjusting screws 224 and 225 serve both to shift and to lock the bearings on said plates 222 and 223.

It is understood that although the conveyorized system of this invention may be wheeled from place to place, as shown in FIG. 4 at 226, threaded feet 227 may be lowered to support the system in a fixed location instead of wheels 226. It may be understood further that various methods of operating the devices described above may be used as determined by the type and function of the controls selected and that the scope of the invention is not to be limited to the device illustrated, but is to be determined by the appended claims.

We claim:

1. Apparatus for automatically tying substantially flat articles together with first and second ties disposed transversely with respect to one another, said apparatus comprising a frame, an article-receiving station on the frame, an article-removing station on the frame, first and second tying machines on the frame intermediate the said stations, and a conveyor for moving the articles from the loading station to the article-removing station past said tying machines, each said tying machine having a plane reference surface on which a substantially flat article normally rests while the tying machine is in operation, and means on the conveyor for presenting an article to be tied to one of said tying machines on a plane other than that of said plane reference surface.

2. Apparatus as described in claim 1, said one of said tying machines having an A-shaped post extending transversely of the direction of movement of said articles past said machine, a shaft mounted on said post with its axis parallel to the direction of movement of the articles and a twine arm secured to said shaft to rotate therewith, said means on the conveyor comprising a trough having a supporting surface for the articles which is coplanar with the said other plane.

3. A tying machine for tying together bundles of substantially flat wide articles, said machine having a frame, a rotatable twine arm, a shaft for driving said twine arm, a post on the frame supporting said shaft, a plane reference surface on said frame normally supporting said articles to be tied, the plane on which said surface lies intersecting the post and the circle described by the twine arm, a knotter mechanism disposed adjacent to said plane reference surface, and means for supporting said articles in a plane angularly disposed with respect to said plane reference surface and intersecting said plane reference surface substantially at the nearest line thereon to the knotter mechanism to bring the articles within the twine arm circle while maintaining an edge of the article in close proximity to the knotter mechanism.

4. A tying machine as described in claim 3, the plane of the bottom surface of said article being disposed at no more than 25° with respect to the said plane reference surface of the said tying machine.

5. A tying machine as described in claim 3, said twine arm shaft supporting post being cantilevered at said shaft to provide space for the bundle to pass said post.

6. Apparatus as described in claim 1, said means on the conveyor comprising a trough having a plurality of aligned independent sections, certain of said sections being supported by said tying machines and the remaining sections being supported by said frame.

7. Apparatus as described in claim 1, said conveyor comprising a trough having a plurality of aligned independent sections, each section comprising a bottom panel, a front panel and a rear panel, means for fixedly mouting the bottom panel of certain of said sections from the frame, means fixedly mounting the front panels of each section to the bottom panels thereof, and means adjustably mounting the rear panels on the bottom panels for movement toward and away from the front panels.

8. Apparatus as described in claim 1, said conveyor comprising a trough having a plurality of aligned independent sections, each section comprising bottom, front and rear panels, and means for pushing bundles of articles to be tied through said trough, said means comprising an endless chain, electrically operated means for driving said chain, pushers for bundles, means for securing said pushers to said chain, said pushers having a part thereof extending downwardly into the trough behind a bundle, and torque-responsive means mounting the downwardly extending part on said pushers to cause said downwardly extending part to yield upon encountering a predetermined resistance.

9. Apparatus as described in claim 8, and switch means operated by said torque responsive means to deactivate the said electrically operated means upon said downwardly extending part yielding as aforesaid.

10. Apparatus as described in claim 8, and switch means for controlling operation of said electrically operated means operated by said torque-responsive means to deactivate said electrically operated means upon said downwardly extending part yielding as aforesaid, said switch means comprising a strip switch disposed adjacent said downwardly extending part and operable upon compression thereof to establish an electric current therethrough, a fixed support for said strip switch, and a finger on said torque responsive means and movable with said downwardly extending part to contact and compress said strip switch against said fixed support for the strip switch.

11. Apparatus as described in claim 8, a track adjacent said chain, rollers on the means securing said pushers to the chain and riding on said track, and switch means for controlling operation of said electrically operated means operated by said torque-responsive means to deactivate said electrically operated means upon said downwardly extending part yielding as aforesaid, said switch means comprising a strip switch secured to said track and operable upon compression thereof to establish an electric current therethrough, and a finger on said torque responsive means adapted to contact and compress said strip switch against said track.

12. Apparatus as described in claim 1, means for driving said conveyor, and means intermediate the driving means and the conveyor for changing the phase relation between said drive means and said conveyor.

13. Apparatus as described in claim 1, an endless chain for driving said conveyor, a drive shaft, a drive sprocket for said chain mounted on said drive shaft, means for driving said shaft, said shaft driving means comprising a source of power and a toothed clutch connecting the source of power to the shaft, and manual means for turning said shaft independently of the power source when the toothed clutch is disconnected.

14. Apparatus as described in claim 13, said power source including means for converting a continuous drive to an intermittent drive whereby bundles are moved by said conveyor to said tying machines and stopped at the tying machines, and said manual means being adapted to change the location of the stopped bundles relative to said tying machines.

15. Apparatus as described in claim 13, spring means for engaging said toothed clutch, manually-operated means for disengaging the toothed clutch against the action of said spring, and said manual means for turning said shaft comprising a hand wheel on the end of said shaft.

16. Apparatus as described in claim 1, and means for compacting a bundle while it is being tied by a tying machine, said means comprising a vertically reciprocable polygonal member, spaced supports on the frame for the member, said support having a multi-sided opening engaging the member to prevent rotation of the member in the support, a foot spaced from the member and adapted to contact a bundle, and means connecting the foot to the member.

17. Apparatus as described in claim 16, said means connecting the foot to the member comprising relatively longitudinally movable parts, one of said parts being secured to the member and the other secured to the foot, and pin-and-slot means for securing said parts together in a selected position of one relative to the other.

18. Apparatus as described in claim 1, a control support for the apparatus, said support having a vertical section and a horizontal section extending over the top of the apparatus, means mounting the vertical section on the frame for oscillating movement thereon about a vertical axis, and a control box mounted on said horizontal section whereby said box may be swung to either side of the apparatus for access thereto from either side of said apparatus.

19. In combination, an endless conveyor, a pusher device driven by said conveyor, said pusher device comprising a post secured to the conveyor and movable therewith, an article-contacting member spaced from said post, and means connecting the article contacting member to the post, said connecting means comprising a rigid member and a torque-responsive clutch connecting said rigid member to said post, whereby to cause said article-connecting member to yield upon encountering a predetermined resistance to movement with said post.

20. The combination described in claim 19, and including electrically driven means for driving said conveyor, switch means for disabling said electrically driven means, and means operated by movement of said rigid member upon said article-contacting member yielding to operate said switch means.

21. The combination described in claim 19, said conveyor comprising a frame, a continuous track on the frame, means mounting the post on the track, electrically driven means on the frame for driving said post mounting means, fixed switch means mounted on said track, and a resiliently mounted finger on the rigid member and adapted, upon said article-contacting member yielding, to contact and operate said switch means.

22. The combination as described in claim 21, said switch means comprising a strip switch secured to a portion of said track.

23. Apparatus for tying substantially flat articles together, comprising a frame having spaced end bays, and an output bay, a long-tie bay, a cross-tie bay, and a power bay disposed between said end bays, tying machines disposed in the long-tie and cross-tie bays, a trough extending from the input bay to the output bay and past the tying machines, pushers extending into the trough and adapted to push articles to be tied through the trough from the input bay past the tying machines to the output bay, an endless chain conveyor, means mounting said conveyor on the frame for movement parallel to said trough and through said bays, said mounting means including means in the end bays for reversing the direction of said conveyor, rigid means extending from the pushers to the conveyor, and a torque-responsive connection between the rigid means and the conveyor to cause said pusher to yield upon encountering a predetermined resistance.

24. Apparatus as described in claim 23, said means mounting the conveyor on the frame comprising spaced upright channel irons on the frame, plates secured to the chain and movable therewith, rollers mounted on the plates, tracks mounted on the channel irons and supporting said rollers, and means for adjusting the position of the track on the channel irons.

25. Apparatus as described in claim 24, said torque-responsive connection comprising an upright post secured to a plate, a pin extending transversely through said post, a second post telescoped over said first post and having a groove in the end thereof adapted to receive said pin, and resilient means urging the first and second posts together.

26. Apparatus as described in claim 23, said trough comprising a plurality of sections disposed in end-to-end relation to one another, and individual means on the frame for mounting each section on the frame, each said individual mounting means comprising upright supports on the frame and adjustable supports on the frame and adjustable connections between the upright supports and the troughs whereby to align said troughs.

27. Apparatus as described in claim 23, said trough comprising a plurality of sections, each section comprising a bottom plate, a vertical front plate fixed to the bottom plate, a vertical rear plate spaced from the front plate, and means for adjustably mounting the rear plate on the bottom plate to vary the width of the trough.

28. Apparatus as described in claim 23, and means at each tying machine for compacting a bundle of articles while said bundle is being tied.

29. Apparatus as described in claim 28, said compacting means comprising a bundle-contacting foot extending into the trough, and means mounting said foot on the frame for vertical reciprocation relative to the trough, said mounting means including means for changing the location of the foot laterally of the trough.

References Cited

UNITED STATES PATENTS

| | | | |
|---|---|---|---|
| 1,454,545 | 5/1923 | La Bombard et al. | 100—4 X |
| 2,662,468 | 12/1953 | Shenigo. | |
| 2,684,626 | 7/1954 | Eberle | 100—4 |
| 2,850,963 | 9/1958 | Grebe et al. | 100—4 |
| 2,867,166 | 1/1959 | Saxton et al. | 100—7 X |
| 3,085,501 | 4/1963 | Wimmer | 100—7 X |
| 3,092,016 | 6/1963 | Nebout et al. | 100—7 |
| 3,114,308 | 12/1963 | Saxton et al. | 100—7 X |
| 3,160,088 | 12/1964 | Burn | 100—7 |
| 3,196,779 | 7/1965 | Embree | 100—4 |
| 3,225,684 | 12/1965 | Smith | 100—4 |

BILLY J. WILHITE, *Primary Examiner.*

UNITED STATES PATENT OFFICE
CERTIFICATE OF CORRECTION

Patent No. 3,350,998                        November 7, 1967

Robert G. Brown et al.

It is hereby certified that error appears in the above numbered patent requiring correction and that the said Letters Patent should read as corrected below.

Column 3, line 44, for "pushed" read -- pusher --; line 71, for "typing" read -- tying --; column 4, line 3, for "contact" read -- connect --; line 34, for "one", second occurrence, read -- on --; column 6, line 60, for "troque" read -- torque --; column 7, line 30, for "172" read -- 127 --; column 8, line 4, for "semi-circular" read -- similar --; column 9, line 13, after "in" strike out "the"; line 46, for "sand" read -- said --; column 10, line 63, for "mouting" read -- mounting --; column 12, line 37, for "boys" read -- bays --.

Signed and sealed this 12th day of November 1968.

(SEAL)

Attest:

Edward M. Fletcher, Jr.                      EDWARD J. BRENNER Attesting Officer                            Commissioner of Patents